UNITED STATES PATENT OFFICE.

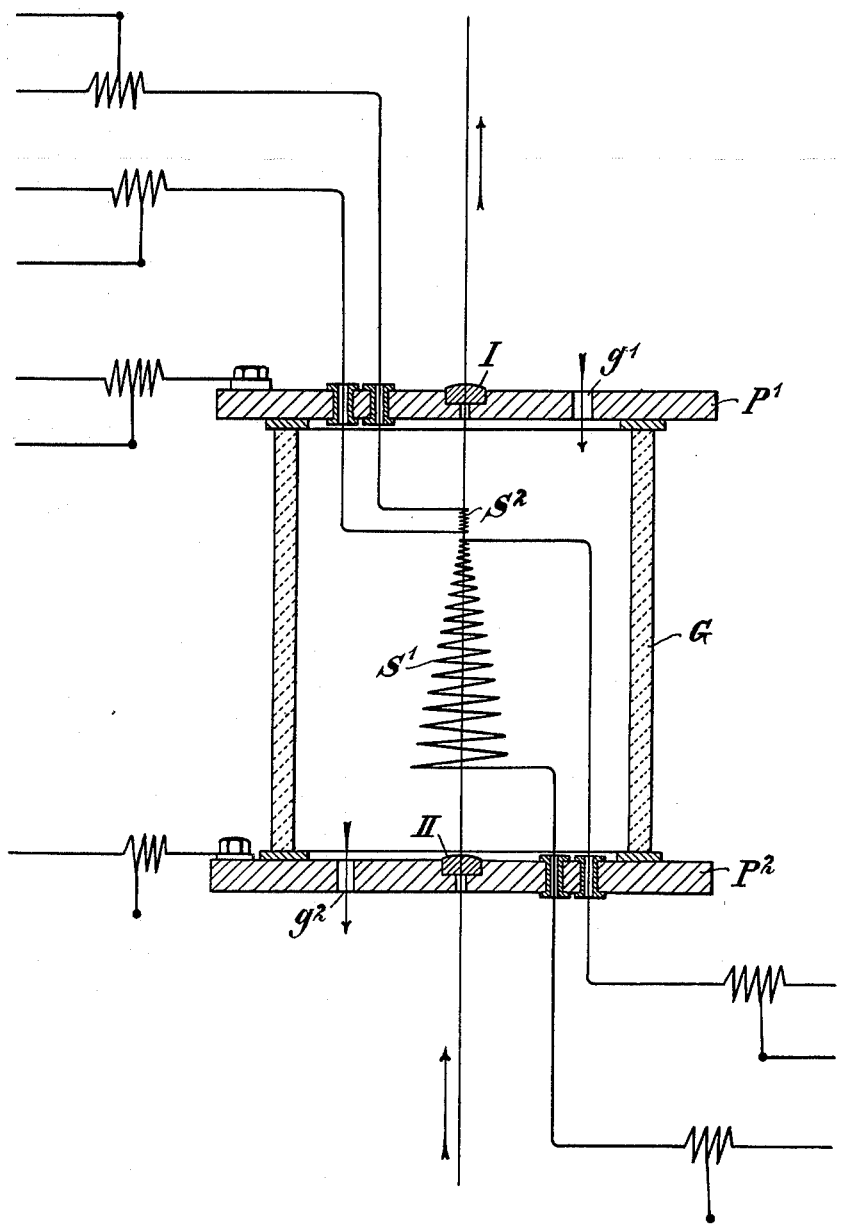

OTTO SCHALLER, OF SÜDENDE, NEAR BERLIN, GERMANY.

PROCESS OF PRODUCING METALLIC WIRES, FILAMENTS, AND THE LIKE.

1,256,929.   Specification of Letters Patent.   Patented Feb. 19, 1918.

Application filed May 16, 1914. Serial No. 839,121.

*To all whom it may concern:*

Be it known that I, OTTO SCHALLER, a citizen of the German Empire, and residing at Südende, near Berlin, German Empire, have invented a certain new and useful Improved Process of Producing Metallic Wires, Filaments, and the like, of which the following is a full, clear, and exact description.

According to the known processes for producing bodies or filaments from metals or alloys of metals, the results attained generally possess a crystalline formation. According to these known processes formations may be attained consisting of consecutive large crystals, one joined to the other, and the breaking points between which can be clearly discerned with the naked eye, or other formations are attained consisting of aggregations of very fine crystals.

Since it is not possible to control the ultimate formation of crystals in producing the same, either by the hardening of molten masses or fluxes or by sintering, the crystals in the final metal body are generally in a disordered state.

If now metallic bodies or masses consisting of a plurality of single crystals are subjected to mechanical operations, such as rolling, hammering or drawing, a further disintegrating or deformation takes place, *i. e.* the single crystals are stretched and the whole crystalline mass is compressed, so that the crystals apparently disappear, in that the formation of sinuous or fibrous structures takes place.

In this process the structure is hardened so that the mechanical properties of the metal, when worked, are very considerably influenced, and more particularly its drawing strength, flexibility and hardness.

But the alteration in the form of the crystal is by no means perpetual. Owing to the inherent nature of materials to return to their original crystalline condition and to the peculiar fact that, in course of time the larger crystals grow at the cost of the smaller ones, an alteration takes place in the structure of metallic bodies thus mechanically deformed.

This structural alteration and the reproduction of the original or a coarser crystalline condition results in the loss or partial loss of the mechanically won properties, such as toughness, flexibility and the like.

Structural alterations of this class, which are generally termed recrystallization are due to various circumstances. Thus articles of pressed brass sheet metal will become fragile after a time. Certain classes of iron crystallize, after continuous vibration, while copper wire becomes absolutely brittle under the effect of certain electric currents passed through it.

Recrystallization takes place most often under the effect of heat. Thus for instance a reformation of the previously fibrous structure of pure copper wire takes place between 200° cent. and 300° cent., that of iron at 600° cent. The higher the temperature at which mechanically produced bodies or wires are employed, the more rapid is the recrystallization *i. e.* the return to the brittle condition.

These conditions are particularly noticeable in connection with tungsten and similar brittle and highly refractory metals. Thus, for instance, if bodies of compressed tungsten are converted into wire by mechanical means and such wire or filament is employed in electric incandescent lamps, the recrystallization takes place in a comparatively short period owing to the high temperature, so that the original considerable strength and ductility of the tungsten wire or filament decreases and finally disappears entirely.

These effects are also noticeable in connection with incandescent bodies of tungsten and alloys of the same made according to the sintering process. This class of filament possesses initially an even, finely crystalline structure but, after long use at a high temperature, the smaller crystals combine to form uneven, coarse crystalline structures, so that the wire becomes brittle and breakable in course of time. It has been noticed that incandescent bodies of tungsten recrystallize more quickly when subjected to the action of an alternating current.

The object of the present invention is to avoid the recrystallization of wires or filaments and the like. If, for instance, the wire consists of a single crystal, no alteration of the same will take place.

It has been found by experimenting in this direction, that a crystal of continuous, i. e. practically continuous length, can be produced. This is the subject matter of my application No. 839,122 of even date.

This is particularly the case in connection with substances having a coarse crystalline structure.

The process forming the object of the present invention consists in passing a filament at a certain speed through a short zone of high temperature. In order to produce a long, single crystal, the speed at which the filament is passed through the point of highest temperature, must be equal to, or less than, the speed at which the crystal to be formed can grow, or increase. If these conditions are properly observed, the crystal formed in the hottest zone, and constituting the entire cross section of the wire or filament will continuously grow, the following crystals being incorporated or dissolved, to the same extent as the filament moves. That is to say, that the size of the crystal to be formed is regulated by the speed of movement of the filament through the hottest zone.

The source of heat is immaterial. Electric resistance heating or an electric arc or flame may be employed. The filament may also be heated by passing an electric current through the same and simultaneous exterior heating it to the necessary temperature at the point in question.

This process is applicable to metals, metal alloys and solid solutions of metals, more particularly to that class of substances allied to the larger crystalline structures under certain given circumstances.

As illustrating one method of carrying out the process, it will be described in connection with the accompanying drawing, which illustrates an apparatus suitable for the purpose in a central section on a vertical plane.

Finely divided, or pulverized tungsten metal containing, for instance 2% of thorium oxid evenly mixed with the same is taken as an example. A mixture of these substances is advantageously attained by adding a solution of thorium salt in water to a suspension of tungstic acid in water, and stirring continually the paste thus constituted until it is dry. The mixture, thus attained is then reduced for instance by means of hydrogen, care being taken to retain the substance in its finely reduced state. From this product a plastic mass is made in the usual known manner and a filament is pressed from the same, which is advantageously arranged or collected on suitable plates, in the form of coils, of comparatively great length.

The filament is then dried and glowed, in the absence of oxygen at about 1000° cent. temperature, in order to impart to the same the necessary strength or toughness, for the further preparation.

The filament thus attained is advantageously finally prepared in an apparatus of the kind illustrated in the accompanying drawing.

$P^1$ and $P^2$ are metallic plates provided with fine perforations in the center, which are filled with mercury as indicated at I and II. The mercury serves to form a joint and may conduct the current and is kept cool by suitable known means, not illustrated, in order to prevent vaporization of the same during the process. The metallic plates are insulated by suitable means such for instance as a glass cylinder G.

The boring $g'$ serves for the introduction of an inert gas which passes out at $g^2$.

The metallic plates may be connected to suitable conductors as indicated in the drawing. The mercury contacts may serve to conduct current through the part of the wires I to II, which current heats the filament to any desired temperature, and the intensity of which may be easily regulated by the selection of suitable resistances.

This heating zone may consist of a spiral $S^2$, which must be capable of being heated to a white heat of the highest grade, in order to provide the highest temperature for the filament at this point.

The filament to be produced is taken through the perforations of the plates $P^2$, then through the spiral $S^1$, the second spiral $S^2$ and finally through the plate $P^1$.

The spiral $S^2$ is heated so that the filament receives about 2400° C. at the hottest point. When these conditions have been properly adjusted, the filament is slowly drawn through the plates in the direction from II to I at a speed of approximately 5 meters an hour. This speed must be varied according to the quality of the material used and the temperatures employed, and may be easily found. It must however under no condition be greater than that of the growing crystal.

The filament produced, whether in the above described or in any other manner consists of a single elongated crystal. The greatest advantage of a filament produced according to the present process is that the same does not change its structure under usual circumstances, nor does any recrystallization take place.

Wire or fibrous material made according to the present process can be easily drawn or rolled in a cold state. Care must be taken to draw or roll the same so as to allow the crystal time to accommodate itself to the conditions.

I claim as my invention:—

The process of producing a metal filament consisting of a single crystal, which consists in passing a metal filament through a zone of a temperature capable of producing crystallization, at such a speed that a crystal is formed and that the crystal is removed from the crystallizing zone while the crystal is being enlarged lengthwise by continued crystallization thereon of the filament following.

In testimony whereof I affix my signature in the presence of two witnesses.

OTTO SCHALLER.

Witnesses:
  WOLDEMAR HAUPT,
  HENRY HASPER.